(12) United States Patent
Adachi et al.

(10) Patent No.: US 8,584,315 B1
(45) Date of Patent: Nov. 19, 2013

(54) GROMMET

(75) Inventors: Masanori Adachi, Okazaki (JP); Dale J. Smutny, Canfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/465,066

(22) Filed: May 7, 2012

(51) Int. Cl.
*F16L 5/00* (2006.01)

(52) U.S. Cl.
USPC ............ 16/2.1; 16/2.2; 174/152 G; 174/153 G

(58) Field of Classification Search
USPC ...... 16/2.1–2.5; 174/152 G, 153 G, 167, 650, 174/668, 669; 277/606, 616; 248/56
See application file for complete search history.

(56) References Cited

U.S. PATENT DOCUMENTS

| | | | |
|---|---|---|---|
| 5,531,459 A | | 7/1996 | Fukuda et al. |
| 5,732,440 A | * | 3/1998 | Wright ............................ 16/2.2 |
| 5,739,475 A | * | 4/1998 | Fujisawa et al. .......... 174/153 G |
| 5,774,934 A | | 7/1998 | Fujita et al. |
| 6,088,874 A | * | 7/2000 | Nakata et al. ..................... 16/2.1 |
| 6,486,400 B1 | | 11/2002 | Smutny et al. |
| 6,495,767 B2 | * | 12/2002 | Okuhara et al. .......... 174/152 G |
| 6,603,078 B2 | * | 8/2003 | Okuhara et al. .......... 174/153 G |
| 6,685,195 B2 | * | 2/2004 | Uchida et al. ................. 277/628 |
| 6,825,416 B2 | | 11/2004 | Okuhara |
| 7,026,549 B1 | * | 4/2006 | Smutny et al. ................... 248/56 |
| 7,098,402 B2 | * | 8/2006 | Suzuki .......................... 174/668 |
| 7,420,125 B2 | * | 9/2008 | Tsukamoto et al. ...... 174/153 G |
| 8,017,870 B2 | * | 9/2011 | Kawakami et al. ....... 174/153 G |
| 2005/0139381 A1 | | 6/2005 | Sanroma et al. |

FOREIGN PATENT DOCUMENTS

| | | |
|---|---|---|
| EP | 0798166 A2 | 10/1997 |
| JP | 07336068 A | 12/1995 |
| JP | 2008234946 A | 10/2008 |

OTHER PUBLICATIONS

EP Search Report dated Aug. 8, 2013.

* cited by examiner

Primary Examiner — William Miller
(74) Attorney, Agent, or Firm — Thomas N. Twomey

(57) ABSTRACT

A grommet extends along an axis for insertion into a hole of a panel. The grommet includes a hollow funnel-shaped section inclined to the axis such that a portion of said funnel-shaped section is compressed radially inward during insertion of the grommet into said hole, the funnel-shaped section terminates at a circular ridgeline. The grommet also includes a retention groove adjacent to the ridgeline for receiving the panel upon complete insertion of the grommet into the hole. An array of recesses is included on an inside surface of the grommet. The recesses are arranged to expand when the funnel-shaped section passes through the hole during insertion of the grommet into the hole.

14 Claims, 4 Drawing Sheets

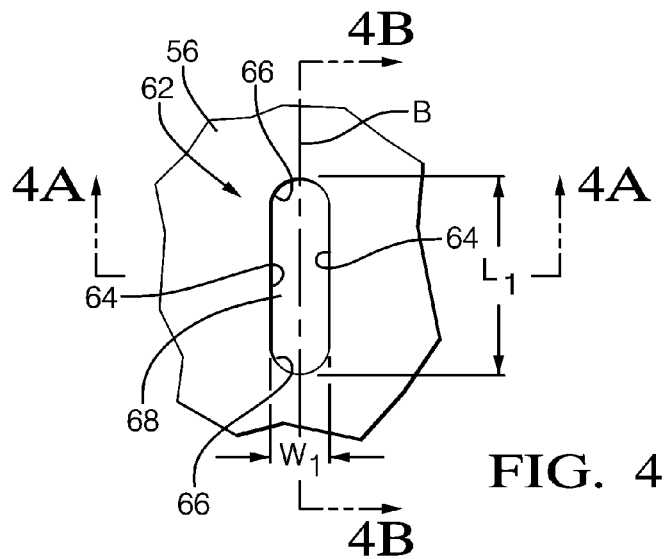
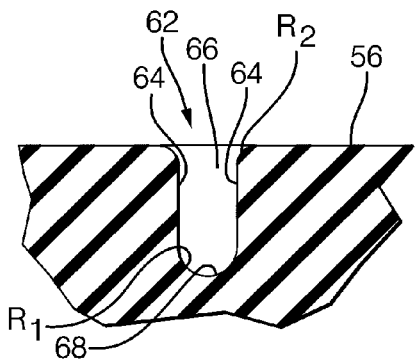
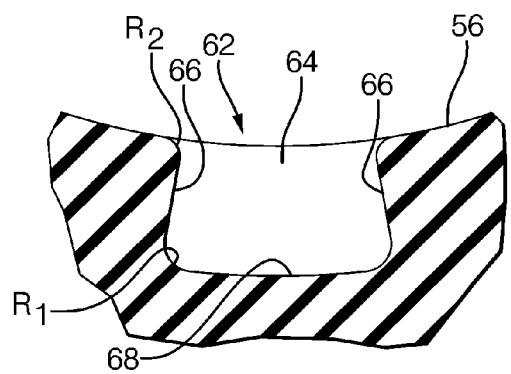
FIG. 4
FIG. 4 A
FIG. 4 B
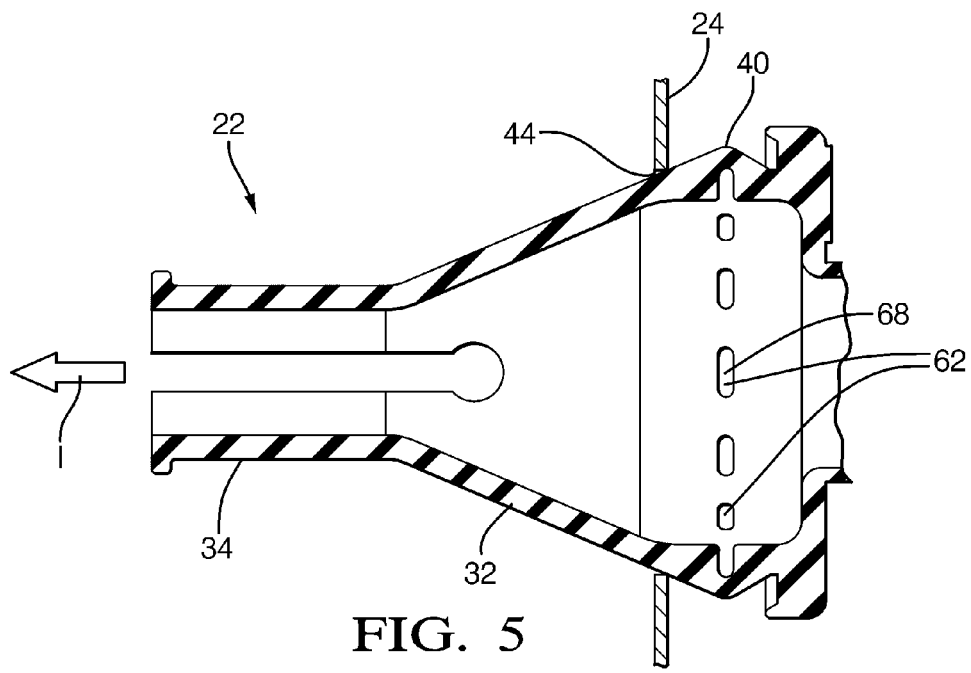
FIG. 5

GROMMET

TECHNICAL FIELD OF INVENTION

The present invention relates to a grommet, more particularly to a grommet that is insertable through a hole in a panel for passing a member therethrough, even more particularly to such a grommet for passing a wire or wiring harness therethrough, and still even more particularly to such a grommet with a reduced insertion force needed for inserting the grommet through the hole in the panel.

BACKGROUND OF INVENTION

Grommets that are insertable through a hole in panel are well known. Such grommets typically include an opening therethrough to allow passage of a body, for example a wire or wiring harness, through the grommet, and consequently through the panel. It may be desirable to minimize the force required, i.e. insertion force, to insert the grommet through the hole of the panel. At the same time, it is also may also be desirable to maintain a force required to remove the grommet from the hole, i.e. pull-out force, which may typically be substantially higher than the insertion force to securely retain the grommet within the hole after installation. In one example, a maximum insertion force of 40N may be desired while minimum a pull-out force of 100N may be desired. More generally it may be desirable for the grommet to have pull-out force that is at least 1.5 times the insertion force.

One way to decrease the insertion force of the grommet is to apply a lubricant to the exterior surface thereof to reduce friction between the exterior surface of the grommet and the hole of the panel. While this method may be effective, the lubricant may be messy or may not be compatible with insulation used on the wire which passes through the grommet. Some lubricants may not provide the desired benefit because they may dissipate too quickly to be beneficial.

Another way to decrease the insertion force of the grommet is by the design or geometry of the grommet. In one design to decrease insertion force, thick ribs may be placed on the outside surface of the grommet which contacts the hole during insertion of the grommet. This creates localized points of contact, which in turn leads to less friction during insertion of the grommet. However, the thick ribs add material and therefore mass and cost to the grommet.

In another design, shown in US Patent Application Publication No. 2005/0139381, a series of relief grooves are placed on the internal surface of the grommet. These relief grooves extend to the end of the grommet and are so placed to decrease the insertion force of the grommet. However, the nature of the relief grooves allows the relief grooves to contract during insertion of the grommet, thereby minimizing the benefit of the relief grooves.

What is needed is a grommet which minimizes or eliminates one or more of the shortcomings as set forth above, what is also needed is such a grommet which reduces the insertion force of the grommet.

SUMMARY OF THE INVENTION

Briefly described, a grommet extending along an axis is provided for insertion into a hole of a panel. The grommet includes a hollow funnel-shaped section inclined to the axis such that a portion of the funnel-shaped section is compressed radially inward during insertion of the grommet into the hole, the funnel-shaped section terminating at a circular ridgeline. The grommet also includes a retention groove adjacent to the ridgeline for receiving the panel upon complete insertion of the grommet into the hole. An array of recesses is included on an inside surface of the grommet. The recesses are arranged to expand when the funnel-shaped section passes through the hole during insertion of the grommet into the hole.

BRIEF DESCRIPTION OF DRAWINGS

This invention will be further described with reference to the accompanying drawings in which:

FIG. 4 is an enlarged view of a portion of the interior of the grommet of FIG. 2;

FIGS. 4A and 4B are cross-section views of the portion shown in FIG. 4 taken through section lines 4A and 4B respectively;

FIG. 5 is an axial cross-section view of the grommet of FIG. 1 being inserted into a hole of a panel;

DETAILED DESCRIPTION OF INVENTION

Figure 1:
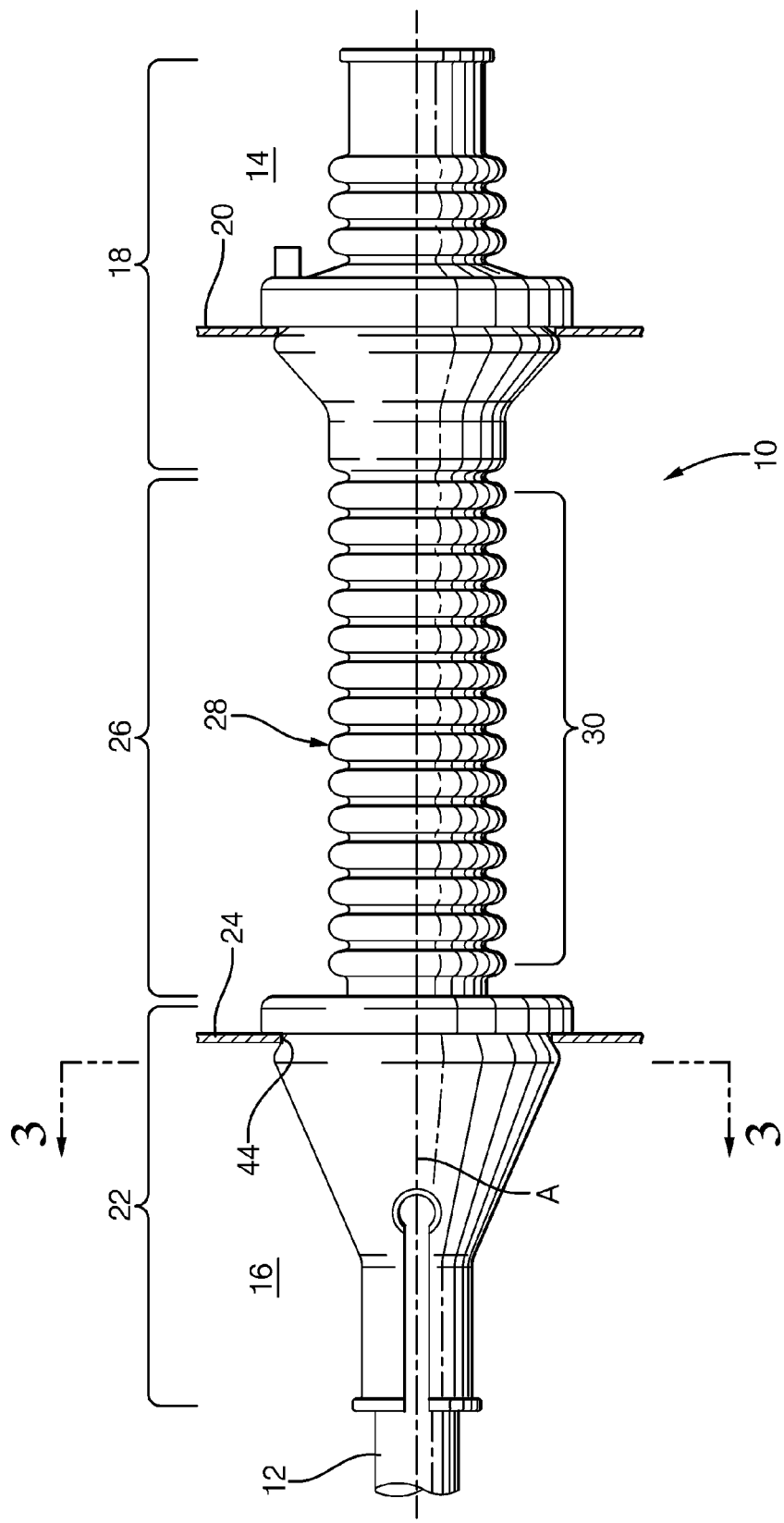
FIG. 1 is an elevation view of a grommet assembly in accordance with the present invention.

Referring now to the drawings wherein like reference numerals are used to identify identical components in the various views, FIG. 1 is a side view of a grommet assembly 10 extending along an axis A for passing a body, shown as wire 12, from a first compartment 14 to a second compartment 16. Grommet assembly 10 may be molded as a single piece using a flexible elastomer material. First compartment 14 may be, for example only, a body of a motor vehicle (not shown) while second compartment 16 may be, for example only, a door of the motor vehicle. Grommet assembly 10 includes a grommet 18 for passage through a panel 20 of first compartment 14, a grommet 22 for passage through a panel 24 of second compartment 16, and a connecting conduit 26 connecting grommet 18 to grommet 22. Connecting conduit 26 may have a connecting conduit sidewall 28 including a plurality of pleats 30 comprising alternating peaks and valleys. Pleats 30 allow for flexibility of connecting conduit 26, thereby allowing relative movement between first compartment 14 and second compartment 16, for example only, as when a door of a motor vehicle is opened and closed.

Figure 2:
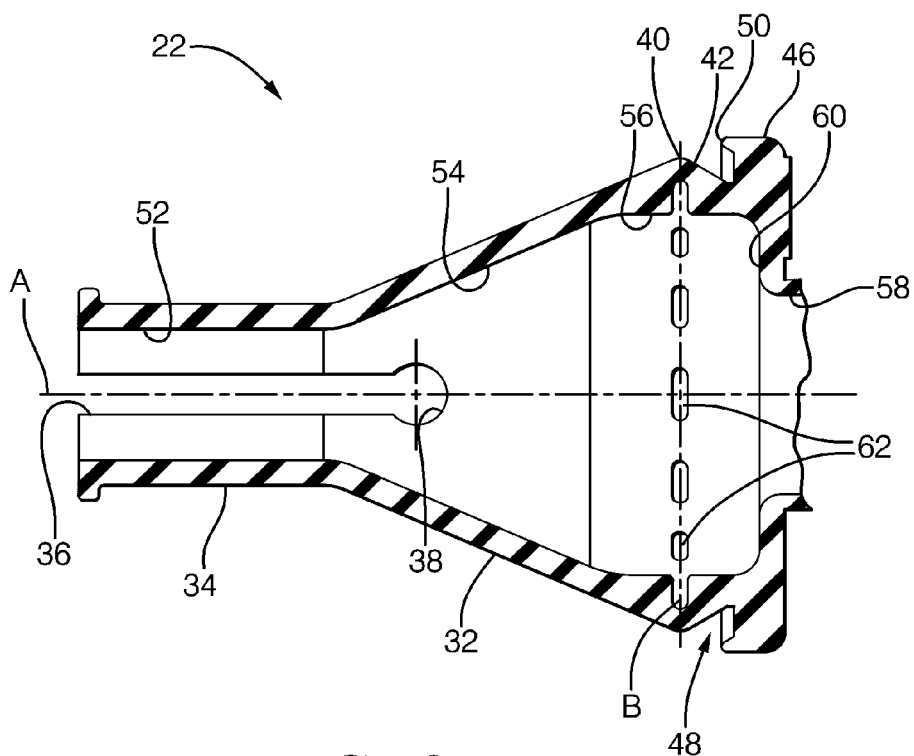
FIG. 2 is an axial cross-section view of a grommet of the grommet assembly of FIG. 1.
Figure 3:
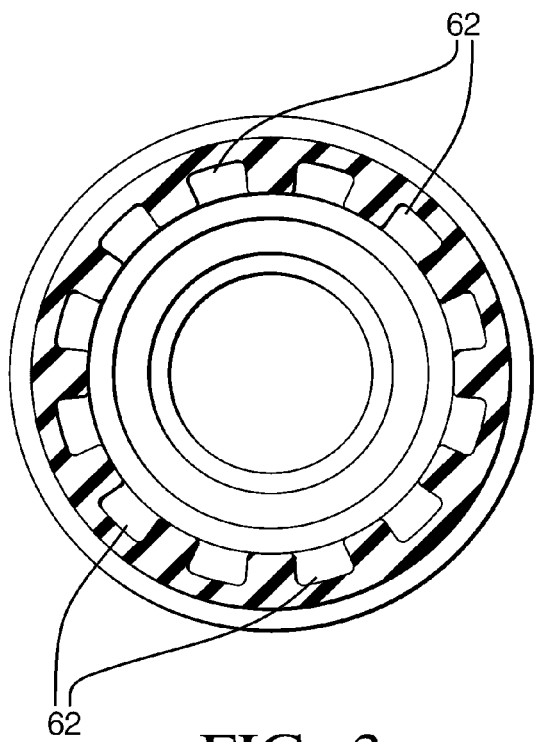
FIG. 3 is a radial cross-section view of the grommet of FIG. 2 taken through section line 3-3 of FIG. 1.

Reference will now be made to FIG. 2 which is an axial cross-section view of grommet 22. Reference will also be made to FIG. 3 which is a radial cross-section view of grommet 22 through section line 3-3 as shown in FIG. 1. Grommet 22 includes a funnel-shaped section 32 which is inclined with respect to axis A. Funnel-shaped section 32 is terminated at its small-diameter end by a tubular section 34 which extends axially away from funnel-shaped section 32 substantially parallel to axis A and terminates one end of grommet 22. Tubular section 34 may include axially extending notches 36 (only one is visible in FIG. 2) to permit, for example only, an electrical connector (not shown) of wire 12 (shown in FIG. 1) to be easily passed through tubular section 34. Notches 36 may extend into funnel-shaped section 32 and may terminate in circular regions 38 which may have a diameter larger than the width of notches 36.

Funnel-shaped section 32 extends to a circular ridgeline 40 which is at the large-diameter end of funnel-shaped section 32 and opposite of tubular section 34. Ridgeline 40 is sized to be larger in diameter than a hole 44 (shown in FIG. 1) of panel 24 through which grommet 22 passes.

A first mounting flange 42 is located adjacent to ridgeline 40 and may be inclined with respect to axis A. As shown, first mounting flange 42 tapers from a maximum diameter that is proximal to ridgeline 40 to a minimum diameter that is distal from ridgeline 40.

Grommet 22 is terminated at a second end, which is opposite of tubular section 34, by a second mounting flange 46 which is larger in diameter than hole 44 and which may be larger in diameter than ridgeline 40. First mounting flange 42 may extend, as shown, to second mounting flange 46. The region between first mounting flange 42 and second mounting flange 46 defines a mounting groove 48. Panel 24 is disposed in mounting groove 48 when grommet 22 is installed through panel 24, and grommet 22 is held securely in place by first mounting flange 42 and second mounting flange 46. The floor of mounting groove 48, i.e. where first mounting flange 42 meets second mounting flange 46, may be sized to have a free state diameter, i.e. before grommet 22 is installed through panel 24, that is slightly larger than the inside diameter of hole 44. For example only, the free state diameter of the floor of mounting groove 48 may be 1 mm larger than the diameter of hole 44. This allows for a compressive force between the floor of mounting groove 48 and hole 44 to aid in sealing. As shown, second mounting flange 46 may include a sealing lip 50 extending axially away from second mounting flange 46 toward first mounting flange 42 to aid in sealing against panel 24 when grommet 22 is installed through panel 24.

With the exterior features of grommet 22 having been described, discussion now will turn to the interior features of grommet 22 with continued reference to FIGS. 2 and 3. Grommet 22 is hollow to allow passage of wire 12 therethrough. The hollow nature of grommet 22 is defined in part by a tubular section inside diameter 52 which extends coaxially through tubular section 34. The hollow nature of grommet 22 is also defined in by part by an inclined interior surface 54 which extends over a portion of the interior of funnel-shaped section 32. The transition from tubular section inside diameter 52 to inclined interior surface 54 may be defined by a radius. Inclined interior surface 54 may be inclined with respect to axis A such that the portion of grommet 22 that includes inclined interior surface 54 has a substantially uniform wall thickness. The hollow nature of grommet 22 is also defined in part by a tubular inside section 56, a portion of which is axially aligned with ridgeline 40. Tubular inside section 56 is parallel and concentric with axis A. The transition from inclined interior surface 54 to tubular inside section 56 may be defined by a radius. The hollow nature of grommet 22 is also defined in part by a passage 58 which provides communication from the interior of grommet 22 to the interior of connecting conduit 26 (shown in FIG. 1). Passage 58 may be smaller in diameter than tubular inside section 56 as shown. The transition from tubular inside section 56 to passage 58 may be defined by an annular wall 60 and a pair of radii.

In order to reduce the insertion force of grommet 22 into hole 44, an array of recesses 62 is provided on tubular inside section 56. For clarity, only some recesses have been labeled with the reference number 62; it should be understood that the identical, unnumbered features are also recesses 62. Recesses 62 are centered about a centerline B which lies on a circle on tubular inside section 56 and which is perpendicular to axis A. Recesses 62 may each be equal is size and spaced evenly around tubular inside section 56. At least a portion of each recess 62 is preferably axially aligned with ridgeline 40 and even more preferably centerline B may be axially aligned with ridgeline 40. Alternatively, but not shown, no part of recesses 62 may be axially aligned with ridgeline 40 and recesses 62 are radially inward of a portion of funnel-shaped section 32 that interferes with hole 44 during insertion. As shown (best shown in FIG. 3), there are 12 recesses 62. However, it should be understood that other numbers of recesses 62 may also be used depending on performance requirements of grommet 22.

Reference will now be made to FIGS. 4, 4A, and 4B in which FIG. 4 is an enlarged view of one of recesses 62 as shown in FIG. 2 and FIGS. 4A and 4B are cross-section views through recess 62. Each recess 62 may be substantially oval or racetrack shaped. In this way, each recess 62 includes opposing sidewalls 64 that are parallel to centerline B and which are connected at each end by endwalls 66 that are arcuate in shape. Sidewalls 64 and endwalls 66 together form a continuous wall defining each recess 62. Each recess has a length $L_1$ along centerline B and a width $W_1$ perpendicular to centerline B when grommet 22 is in the free state. It may be desirable that the sum of lengths $L_1$ of all recesses 62 be between about 30% and about 70% of the circumference of tubular inside section 56, even more preferably between about 40% and about 60% of the circumference of tubular inside section 56, and still even more preferably about 50% of the circumference of tubular inside section 56. Sidewalls 64 and endwalls 66 extend into grommet 22 and truncate at a recess floor 68. A radius $R_1$ may form the transition from sidewalls 64 and endwalls 66 to recess floor 68 while a radius $R_2$ may form the transition from tubular inside section 56 to sidewalls 64 and endwalls 66.

Figure 6:
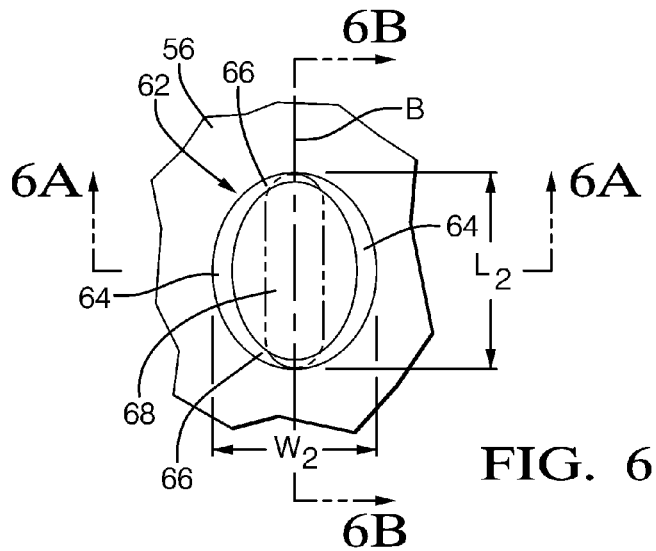
FIG. 6 is the enlarged view shown in FIG. 4 in the condition when the grommet is in maximum interference with the hole of the panel of FIG. 5.
Figure 6A:
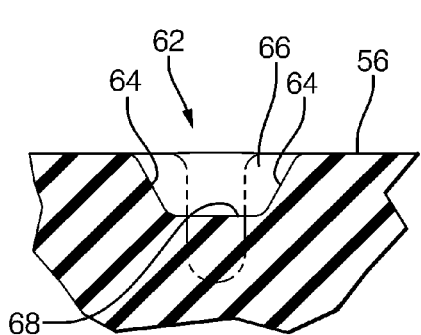
FIGS. 6A and 6B are cross-section views of the portion shown in FIG. 4 taken through section lines 6A and 6B respectively.
Figure 6B:
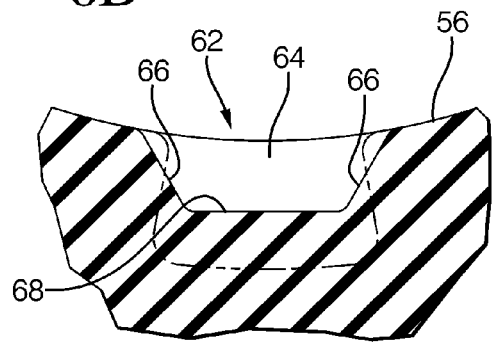

Reference will now be made to FIG. 5 which shows grommet 22 being inserted into hole 44 of panel 24. Reference will also be made to FIGS. 6, 6A, and 6B in which FIG. 6 is an enlarged view of one of recesses 62 when grommet 22 is partially inserted into hole 44 and FIGS. 6A and 6B are cross-section views through recess 62 of FIG. 6. Grommet 22 is inserted into hole 44 by a pulling force in the direction of arrow I as shown in FIG. 5. In this way, tubular section 34 is the first portion of grommet 22 to pass through hole 44. Grommet 22 passes through hole 44 uninhibited until grommet 22 is inserted to a point at which funnel-shaped section 32 is the same diameter as hole 44 as shown in FIG. 5. From this point until panel 24 reaches ridgeline 40, the insertion force increases due to the increasing interference between hole 44 and grommet 22 as the result of the inclined nature of funnel-shaped section 32, thereby compressing funnel-shaped section 32. However, the inclusion of recesses 62 limits the insertion force. As panel 24 proceeds toward and finally reaches ridgeline 40, recess floor 68 of each recess 62 is pushed radially inward toward axis A. When this occurs, each recess 62 is allowed to expand such as to increase the perimeter of recess 62 where it meets tubular inside section 56 as shown in FIG. 6. In this way, each recess 62 expands to a width $W_2$ that is greater than width $W_1$ in the free state (FIG. 4). Each recess 62 may also expand to a length $L_2$ that is greater than length $L_1$ in the free state (FIG. 4), however, the expansion in width is more pronounced that the expansion in length. As can be seen in FIGS. 6A and 6B, sidewalls 64 and endwalls 66 angulate outward from each other as a result of this process. For comparison purposes, FIGS. 6, 6A, and 6B also include phantom lines which represent the shape of recess 62 in the free state.

Figure 7:
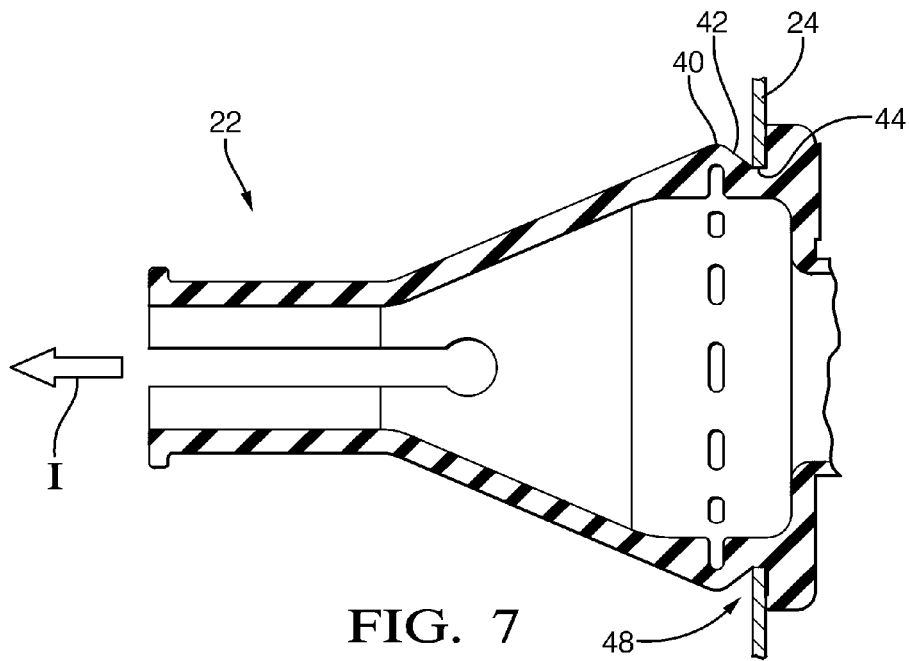
FIG. 7 is the axial cross-section view of FIG. 5 with the grommet fully inserted into the hole of the panel.

Reference will now be made to FIG. 7 which shows grommet 22 completely inserted into hole 44 of panel 24. When panel 24 passes over ridgeline 40 as grommet 22 is pulled in the direction of arrow I, panel 24 descends first mounting flange 42. As this occurs, funnel-shaped section 32 expands and each recess 62 rebounds or contracts to the free state shape shown in FIGS. 4, 4A, and 4B. Grommet 22 is now securely held by panel 24 within mounting groove 48.

While grommet 22, which includes recesses 62 for reducing the insertion force of grommet 22, has been described as a part of grommet assembly 10, it should now be understood that grommet 22 does not need to be used with grommet 18 and connecting conduit 26. For example, grommet 22 may be used alone for passing wire 12 through panel 24.

While this invention has been described in terms of preferred embodiments thereof, it is not intended to be so limited, but rather only to the extent set forth in the claims that follow.

We claim:

1. A grommet extending along an axis for insertion into a hole of a panel, said grommet comprising:
   a hollow funnel-shaped section inclined to said axis such that a portion of said funnel-shaped section is compressed radially inward during insertion of said grommet into said hole, said funnel-shaped section terminating at a circular ridgeline which is larger in diameter than said hole;
   a first mounting flange defining a retention groove adjacent to said ridgeline, said retention groove receiving said panel upon complete insertion of said grommet into said hole;
   an array of recesses on an inside surface of said grommet wherein at least a portion of said recesses are radially inward of a portion of said funnel-shaped section which is larger in diameter than said hole, said recesses being arranged to expand when said funnel-shaped section passes through said hole during insertion of said grommet into said hole.

2. A grommet as in claim 1, wherein each recess is centered about a centerline lying on a circle that is perpendicular to said axis.

3. A grommet as in claim 2, wherein said centerline is axially aligned with said ridgeline.

4. A grommet as in claim 2 wherein each of said recesses has a pair of opposing sidewalls that are connected at each end by endwalls.

5. A grommet at in claim 4 wherein said opposing sidewalls are parallel to said centerline.

6. A grommet as in claim 5 wherein said endwalls are arcuate in shape.

7. A grommet as in claim 4 wherein each of said recesses has a first width in the direction of said axis before said grommet is installed through said hole and wherein each of said recesses expands to a second width that is greater than said first width when said funnel-shaped section passes through said hole during insertion of said grommet into said hole, thereby reducing an insertion force of said grommet.

8. A grommet as in claim 7 wherein each of said recesses returns to said first width when said panel is received within said retention groove.

9. A grommet as in claim 7 wherein each of said recesses has a length along said centerline in said free state, wherein said length is greater than said first width.

10. A grommet as in claim 1 wherein each recess is defined by a continuous wall.

11. A grommet as in claim 1 wherein said inside surface is parallel to said axis.

12. A method of inserting a grommet into a hole of a panel, said method comprising:
   providing said grommet, said grommet extending along an axis and including a hollow funnel-shaped section inclined to said axis and terminating at a circular ridgeline which is larger in diameter than said hole, a first mounting flange defining a retention groove adjacent to said ridgeline, and an array of recesses on an inside surface of said grommet wherein at least a portion of said recesses are radially inward of a portion of said funnel-shaped section which is larger in diameter than said hole;
   passing said funnel shaped section through said hole, thereby compressing said funnel shaped section radially inward;
   expanding said recesses when said funnel shaped section is compressed radially inward;
   receiving said panel within said retention groove after expanding said recesses.

13. A method as in claim 12, said method further comprising expanding said funnel shaped section as said panel is received within said retention groove.

14. A method as in claim 13, said method further comprising contracting said recesses as said funnel shaped section expands.

* * * * *